United States Patent [19]
Spurling

[11] Patent Number: 6,139,455
[45] Date of Patent: Oct. 31, 2000

[54] MAIN ROTOR DRIVE FOR A ROTARY WING AIRCRAFT

[76] Inventor: John T. Spurling, Rte. 3, Box 12 C, Cleveland, Okla. 74020

[21] Appl. No.: 09/082,397

[22] Filed: May 20, 1998

[51] Int. Cl.[7] ................................ F16H 7/24; F16H 7/10
[52] U.S. Cl. ...................... 474/150; 474/112; 474/146; 474/161
[58] Field of Search ................... 474/101, 110, 474/133–37, 150, 144, 146, 250, 267, 268, 161, 903, 112; 74/443

[56] References Cited

U.S. PATENT DOCUMENTS

| | | | |
|---|---|---|---|
| 3,696,685 | 10/1972 | Lampredi | 474/161 |
| 4,521,208 | 6/1985 | Doveri | 474/101 |
| 4,571,224 | 2/1986 | Arinaga | 474/153 |
| 4,877,126 | 10/1989 | Van Calker et al. | 474/267 X |
| 4,884,949 | 12/1989 | Eakin | 474/150 X |
| 4,966,571 | 10/1990 | De Guillebon | 474/112 X |
| 5,221,236 | 6/1993 | Raymer et al. | 474/150 X |

FOREIGN PATENT DOCUMENTS 2910871  9/1980  Germany ............................ 474/153

*Primary Examiner*—David A. Bucci
*Assistant Examiner*—Marcus Charles

[57] ABSTRACT

Improvements in the method of power transmission to the main rotorshaft of a specific type of rotary-wing aircraft through the provision of modern drive components specifically adapted to provide enhanced reliability, safety, passenger comfort, performance and economy in the operation and maintenance of such aircraft.

16 Claims, 2 Drawing Sheets

MAIN ROTOR DRIVE FOR A ROTARY WING AIRCRAFT

BACKGROUND OF THE INVENTION

Field of the Invention

The present invention generally relates to improvements in power transmission in rotary-wing aircraft, and more specifically to the means employed in driving the main rotor of such aircraft, yet more specifically to the type of light-weight rotorcraft which are constructed by amateur craftspersons (homebuilders), and most specifically to rotorcraft employing sprockets and roller-chain for the main rotor drive, such as are provided in kit form, for home assembly by the firm RotorWay, International in their "Exec 162" series.

BACKGROUND OF THE INVENTION

Commercially manufactured rotorcraft, or helicopters, both of the military and civil types are generally provided with highly complex, specially designed transmissions to convert the high-speed, low-torque rotation, about the horizontal axes of their prime-movers, to a lower-speed, high-torque rotation of their vertical main rotor shafts. This is especially true in designs where the prime-mover is a turbine engine having the primary output shaft in an horizontal plane. In light-weight sport rotorcraft, however, where power is provided by less costly internal-combustion engines, it has long been the practice to orient the crankshafts of these engines in the vertical plane to obviate the requirement for heavy, power-consuming, right angle transmissions and allowing the primary and secondary reduction drive shafts to operate in the same vertical plane at a great saving of weight, complexity and cost.

For more than a quarter-century, builders of experimental rotorcraft have been provided with construction kits wherein the final rotor main-shaft drive is accomplished through the use of industrial grade sprockets and multi-row roller-chain. The present invention addresses a number of problems, operational and service difficulties, and safety concerns which are associated with the use of such a drive. Among them are: excessive weight of the component parts; the generation of high temperature created by friction between chain and sprockets; friction and wear in chain joints; the requirement for oil-bath lubrication to lubricate said sprockets and chain joints and transfer heat to the oil bath case; difficulties in containing said oil within said oil-bath case; fire hazard created by the leakage of said oil on and about other components within the power compartment; shortened primary reduction drive belt life for the same reason; extremely limited service-life of the roller-chain due to operation beyond it's design parameters; high and frequent replacement cost of chain; high noise and vibration level and; most importantly, the possibility of chain breakage resulting in catastrophic failure of the main rotor system, or lock-up of the main rotor, preventing the possibility of auto-rotation to a safe landing, resulting in endangerment, not only to persons aboard the helicopter, but also to those on the ground.

By way of further explanation, it should be understood that roller-chains, of both the single and multi-row variety, are designed and intended for use in applications where power is transmitted between shafts or axes which rotate in the horizontal plane. When the driving and driven sprockets are properly aligned, on shafts oriented in the horizontal plane, and are operated at relatively low linear and rotational speed, the power is transmitted from driving sprocket to driven sprocket by the rollers and pins, through the side plates of the roller chain. Said side plates, having little or no contact with the sprockets themselves are a minimal source of friction and the resultant heat, and require little lubrication. Conversely, when the driving and driven shafts are oriented in the vertical plane, the entire, not inconsiderable, weight of the roller chain must be constantly borne by the inside of the upper side plates in contact with the driving and driven sprockets, immensely increasing the friction and, as a consequence, the heat generated in the transmission of power. Said friction and the consequential generation of heat is exacerbated when the roller chain is operated at or near the upper rotational limit of the chain. When operated beyond the rotational design limit, the friction and consequent heat increase exponentially, creating the requirement for the application of massive amounts of lubricant, not only to reduce the friction between said side plates and said sprockets, but also to transfer the heat away from these parts for dissipation elsewhere. The prior and current state-of-the-art for heat dissipation and lubricant containment, in the light helicopter field, is to provide an oil-bath for this purpose. In and of itself, the oil-bath tends to create more problems than it solves, as the high rotational speed of the sprockets and chain centrifuge the lubricant, away from the chain and sprockets, to the periphery of the containment vessel where said lubricant builds up against the inner wall of said vessel and circulates about said periphery in concert with the rotating chain, thus lowering the level of lubricant available in the center of the oil-bath, leading to lubricant starvation of the chain and sprockets. This series of events leads to rapid wear and the requirement for early replacement of both chain and sprockets and an increasingly eminent possibility of catastrophic in-flight drive-train failure.

Additional problems, related to oil leakage, have been encountered with the currently employed oil-bath lubrication method as the lubricant is forcefully ejected from the containment vessel by centrifugal force and; by lubricant leakage around and through oil-sealing means employed on the various shafts traversing the oil-bath containment vessel. This leakage results in the deposit of large quantities of lubricant on, about and in, various components of the prime mover and drive train of the light rotorcraft. These deposits result in, but are not limited to: the rapid deterioration of the primary speed-reduction endless trapezoidal (V) belts, tail rotor drive V-belt, accessory (alternator, engine coolant pump, and coolant radiator fan) drive V-belts, flexible oil and coolant lines, and the displacement of lubricating grease in drive-train bearings. Additionally, the projection of flammable, petroleum-based lubricating fluids onto the high-temperature surfaces of the engine exhaust manifold and piping enhance the probability of in-flight fire. Further, difficulties are presented in conducting frequently required inspections of the drive-chain and sprockets, as the current practice of their enclosure in an oil-bath containment vessel makes it virtually impossible to thoroughly inspect each chain link and sprocket tooth without a complete dismantlement. It is emphasized that the failure of a single chain link can have catastrophic consequences. It should be noted that the maximum service-life of the currently employed drive chain is 100 hours, at which time its replacement is mandatory.

It is the intent, objective and purpose of the present invention to improve, not only the safety, reliability, and durability of the rotorshaft drive in light helicopter applications, but to also improve the efficiency of power delivery to the rotorshaft through the reduction of fiction; to reduce airframe fatigue caused by power-train vibration and; to increase the useful load capacity of the rotorcraft through a reduction in the weight of power-train components; to eliminate the requirement for lubrication of the final rotorshaft drive thereby eliminating the weight of the lubricant containment vessel and the lubricant therein contained, substantially reducing the possibility of leakage induced fire; to provide enhanced damping of powerplant impulses to the main rotorshaft; to provide unrestricted drive train inspection access and; to improve pilot and passenger comfort through reduction of cabin sound levels and vibration.

In keeping with the spirit and purpose of Federal Aviation Administration (FAA) Regulations governing experimental category aircraft, the present invention is the result of extensive experimentation, prototyping, development and operational verification, both on the ground and in the air.

Description of the Related Art

A diligent search of the prior art relating to helicopter and aircraft drive systems was conducted in the Public Search Room of the United States Patent and Trademark Office. The Field of Search was in U.S. Classifications 244/6; 244/17.11+; 244/53R; 244/60; 416/20R; 416/131+. Said search failed to reveal any reference to chain-driven helicopter main rotor systems, thus it would appear that no United States Letters Patent have been granted, and that the sole employment of such a drive for this purpose is in the prior and current use of this type drive by the aforementioned RotorWay, International firm. It is for this reason that no other prior art or usage is cited.

SUMMARY OF THE INVENTION

The present invention is an improvement to light helicopter main-rotor drive systems which employ roller-chain sprockets and roller-chain in the final rotational speed reduction to the main rotor shaft through the employment of the combination of synchronous or timing belt sprockets (hereinafter cog-belt sprockets), and a correspondent elastomeric endless synchronous or timing belt (hereinafter cog-belt), to provide positive rotation of the rotorshaft, with a reliability approximating, or perhaps exceeding, that of geared transmissions, resulting in: 1) a safer; 2) quieter; 3) lighter; 4) vibration-free; 5) cooler operating; 6) long-term maintenance-free rotor drive; 7) reduced drive-train friction resulting in more available power to the rotorshaft; 8) obviation of the requirement for chain lubrication and; 9) frequent drive-train component replacements. The present invention also provides: 10) a more reliable and; 11) economical means of power transmission; 12) ready access for inspection of drive-train components; 13) a cleaner power compartment, thereby; 14) reducing the possibility of fire and, most importantly; 15) through the preservation of the integrity of the main rotorshaft and rotating wing, retention of the ability of the rotorcraft to auto-rotate to a safe landing following a failure of the prime-mover or of any component or components of the rotorshaft drive-train.

BRIEF DESCRIPTION OF THE DRAWING FIGURES

Note: In the numeric identification of components illustrated in the Figures of the Drawings, identical components are numbered identically in the various Figures.

DESCRIPTION OF THE PREFERRED EMBODIMENT

Figure 1:
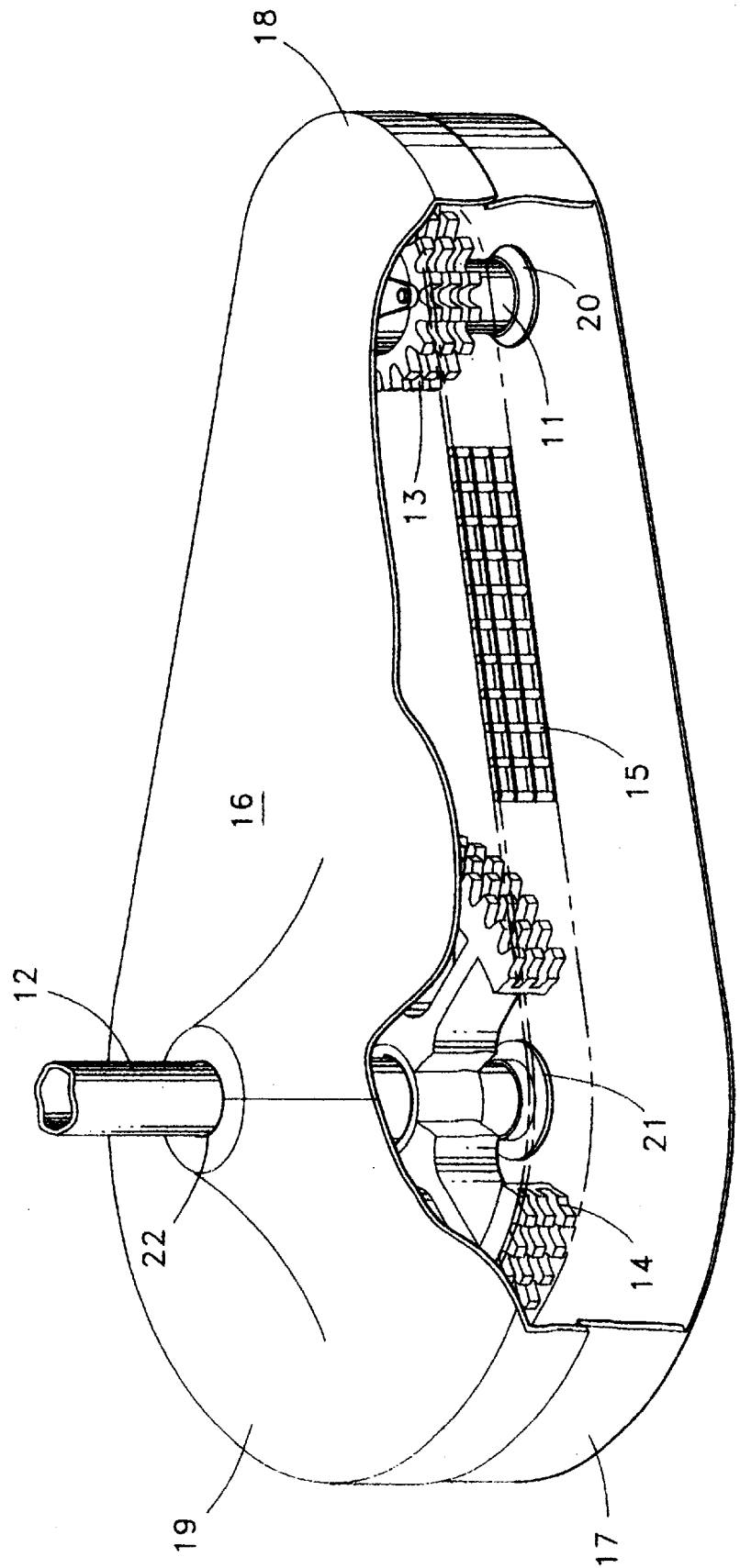
FIG. 1 is a three-dimensional perspective view illustrative of the secondary speed-reduction of the main rotorshaft drive currently employed in particular models of light rotorcraft.
Figure 2:
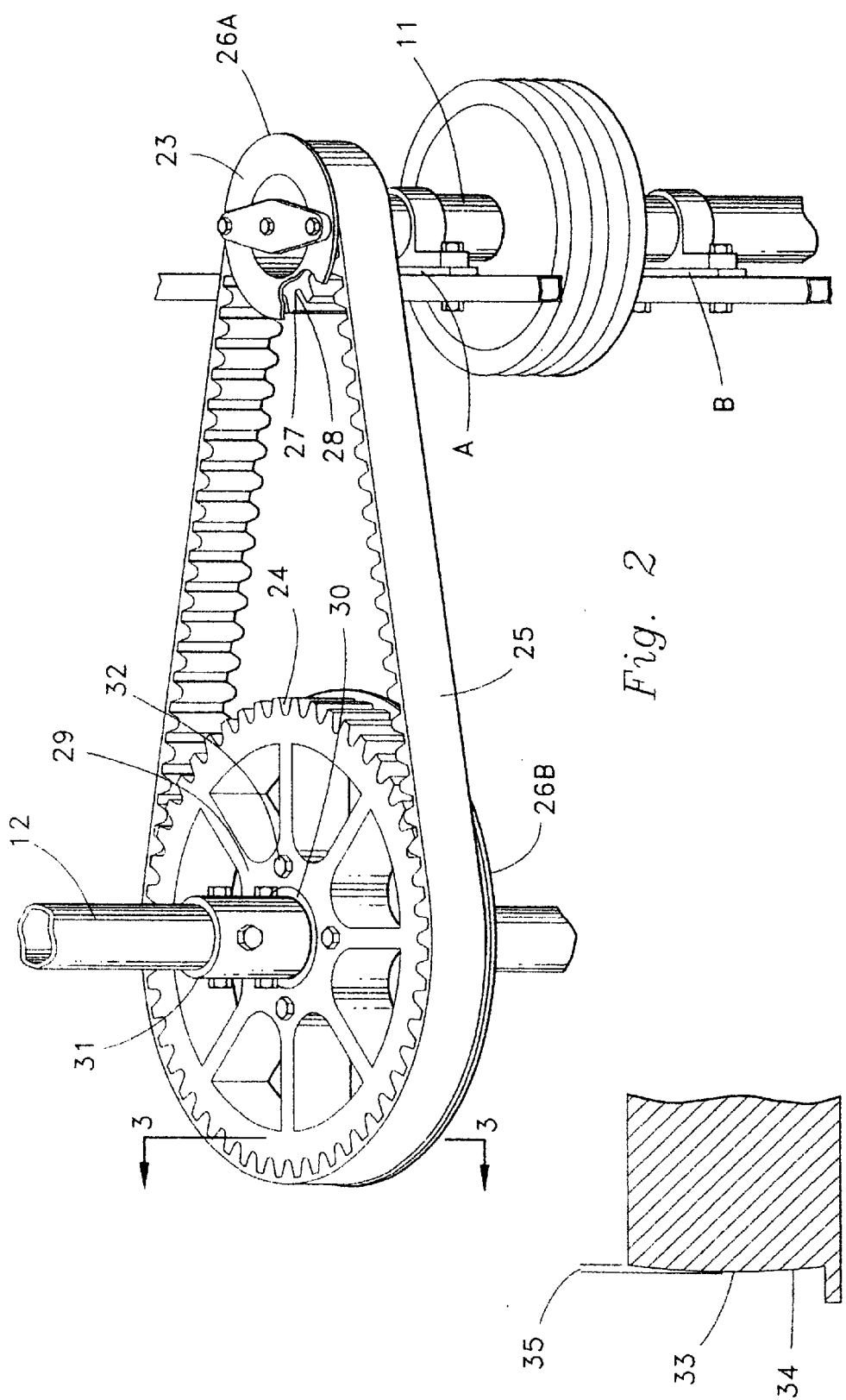
FIG. 2 is a three-dimensional perspective view of the secondary speed-reduction drive to the main rotorshaft of the present invention.

Referring now to the Figures of the Drawings it will readily be seen through the comparison of the current methodology illustrated in FIG. 1, and that of the present invention illustrated in FIG. 2, that the present invention teaches a major improvement in the transmission of power from the Primary Speed-Reduction Output Shaft 11 of a light helicopter to the final speed-reduction output at the Rotorshaft 12. It will be seen in FIG. 1 that power transmission from Driving Roller-Chain Sprocket 13, to Driven Roller-Chain Sprocket 14 is accomplished through the employment of a Multi-Row Roller-Chain 15 therebetween. It will be further seen that a Lubricant Containment Vessel 16 comprising a Lower Oil-Bath Pan 17, a Top Rear Cover 18, a Top Front Cover 19, a Rotary Oil Seal 20, a Rotorshaft Oil Dam 21, and a split Upper Rotorshaft Aperture 22, are provided to contain lubricant for the sprockets 13 and 14, and chain 15.

In FIG. 2 the comparative simplicity of the main rotor drive system of the present invention is readily observable in the complete deletion of oil containment means, as no lubrication is required for Driving Cog-Belt Sprocket 23 and Driven Cog-Belt Sprocket 24 and power transferring Cog-Belt 25. It has been the goal of the inventor to provide maximum result with minimum complexity by, wherever possible, making the design compatible with the existing airframe and its components. That goal has been achieved.

In the preferred embodiment of the present invention Driving Roller-Chain Sprocket 13 on Primary Speed-Reduction Output Shaft 11 is replaced by Driving Cog-Belt Sprocket 23, having a small external diameter, of approximately four inches, which is fixedly attached to said Output Shaft 11. Driven Roller-Chain Sprocket 14 on Rotorshaft 12 is replaced by Driven Cog-Belt Sprocket 24, having a greater external diameter, of approximately 14 inches, which is fixedly attached to existing Hub 31 which in turn, is fixedly attached to Rotorshaft 12. The two Cog-Belt Sprockets 23 and 24 are rotatably connected through the provision of Cog-Belt 25 therebetween, thus providing a secondary speed-reduction and a positively synchronized rotating driving force to Rotorshaft 12. Tension adjustment of Cog-Belt 25 and the maintenance of parallelism between the Primary Speed-Reduction Output Shaft 11 and Rotorshaft 12 is accomplished through the placement of equal-thickness shims subjacent to, and interposed between, the ball-bearing housings and the rotorcraft frame as is illustrated at points A and B in the view in FIG. 2. [Note: This method of adjustment is provided by the rotorcraft kit manufacturer and is not to be construed as a part of the present invention.]

Driving Cog-Belt Sprocket 23 is a direct replacement of the currently employed Driving Roller-Chain Sprocket 13. Said Driving Cog-Belt Sprocket 23, of steel, cast-iron or other suitable construction, employs a conventional shaft-gripping tapered hub such as the "TAPER-LOCK®" of the Dodge-Emerson Corporation or the "SURE-GRIP®" bushing of the T. B. Wood's Sons Company for its attachment to the Primary Speed-Reduction Output Shaft 11 to assure true axial rotation of said sprocket. The peripheral outer face of said sprocket is provided with a multiplicity of precisely formed Lands 27 and Grooves 28 radially spaced-apart thereabout, traversing the width thereof Said lands and grooves being correspondent to the profile or "pitch" of commercially available "KEVLAR®," DuPont™ brand of poly-paraphenylene terephthalamide, reinforced Cog-Belts, such as those offered by Gates Rubber Co. as "POLYCHAIN GT®," and Dodge/Reliance Corp. as "GT POLYCHAIN®", also by Dayco Products, Inc., Browning-Emerson Power Transmission Corp., Jason Industrial, Inc., and numerous others. Said Cog-Belt Sprocket 23 further comprises an integrally cast Anti-Excursion Ring 26a of a slightly greater diameter about the upper periphery thereof to assure the retention of said Cog-Belt upon said sprocket and prevent its upward departure therefrom in the event that the tension imposed upon said Cog-belt be relaxed.

As weight is a primary consideration in all aircraft applications, relating directly to the useful load carrying capacity and performance of the aircraft, the Driven Cog-Belt Sprocket 24, a direct replacement of the currently employed Driven Roller-Chain Sprocket 14, is derived from an aluminum alloy casting having a plurality of spokes extending radially outward from a solid central portion 29 which is provided with a centrally situate Bore 30 adapted to precisely accommodate the existing, currently employed, Flanged Hub 31, from which Driven Roller-Chain Sprocket 14 has been removed.

Figure 3:
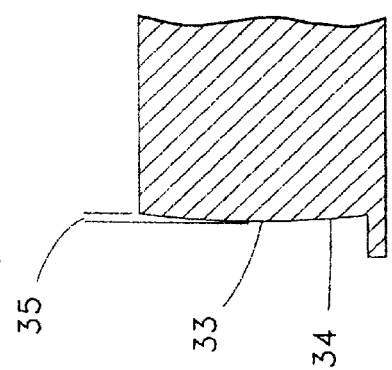
FIG. 3 is an exaggerated view of the "crown" on the peripheral face of the driven cog-belt sprocket.

As illustrated in the exaggerated detail view of FIG. 3, the outer peripheral face 34 of said sprocket 24 is configured to provide a Crown 33 or slightly enlarged diametric dimension, of approximately 0.010 inch 35, circumferentially about the center of the width of said peripheral face 34, said crown 33, being an outwardly extending, true arcuate segment, of a constant radius, centered between the opposing sides thereof. While imperceptible to the unaided human eye said crown 33 encourages the cog-belt, operating thereupon, to run or "track" in the center of said peripheral face. Various loadings placed on a main rotor cause instantaneous minute flexure of the rotorshaft resulting in instant loss of parellelism of Primary Speed-Reduction Output Shaft 11 and Rotorshaft 12. Said loss of parallelism results in the Cog-Belt 25 deviating from its central "track" on the two cog-belt sprockets. The presence of the Crown 33 causes said cog-belt to resume its central "track." Said Crown 33, causing the centralization of said cog-belt on said cog-belt sprockets, further permits operation on vertically oriented shafts by resisting the downward force of gravity, thus preventing the natural tendency of said belt to gravitate into contact with the lower anti-excursion ring on said driven cog-belt sprocket. Said Driven Cog-Belt Sprocket 24 further comprises an integrally cast Anti-Excursion Ring 26b of a slightly greater diameter about the lower periphery thereof to restrict said deviation and assure the retention of said Cog-Belt upon said driven sprocket and prevent its downward departure therefrom should the tension imposed upon said belt be relaxed. A similar Anti-Excursion Ring 26a on the upper periphery of the driving sprocket cooperates with Ring 26b to limit upward deviation of said cog-belt 25. It is to be noted that the breadth of the two sprockets exceeds that of the cog-belt running thereupon by a dimension approximating one-half inch. Said excess being provided to allow for transverse deviation of said belt upon said sprockets before engaging the upper or lower rings 26a and 26b which are intended and serve as limiters of transverse deviation in the event of extreme rotorshaft flexure. The outer peripheral face of Driven Cog-Belt Sprocket 24 is provided with a multiplicity of precisely formed, spaced-apart, Lands 27 and Grooves 28 traversing the width thereof, said lands and grooves being adapted for conformity with the profile or "pitch" of commercially available Cog-Belts such as are hereinbefore set forth. Secure attachment of said sprocket 24 to said Hub 31 is provided by a plurality of bolts, 32 which pass through a plurality of dimensioned bores traversing the flange of said Hub and corresponding bores through the solid central portion 29 of sprocket 24, and matching nuts. The sprocket and hub assembly are secured to Rotorshaft 12 by a plurality of bolts which pass through a plurality of existing diametric bores in Hub 31 and Rotorshaft 12 and matching nuts. Said sprocket 24 is dynamically balanced to assure vibration-free operation at all rotorshaft speeds.

FIG. 2 illustrates the dramatic improvement in inspection and maintenance access provided by the present invention, wherein the entire rotorshaft drive train is readily available for visual and manual inspection. It is only necessary to remove the cowling from the power compartment to have unrestricted visual and manual access to all components of the rotorshaft and accessory drives. It should be noted that the present invention may be viewed from below, as well as above, and both the inner and outer portions of the drive are visually and manually accessible for inspection and maintenance It should also be noted that no special jigs, fixtures or equipment are required for the conversion, from chain to the improved cog-belt drive, which is accomplished with common hand-tools. The only "special" equipment required is a small hydraulic jack which is placed between the opposing faces of Cog-Belt Sprockets 23 and 24 to impose the proper tension upon Cog-Belt 25 and allow the placement of equal-thickness shims at points A and B. Proper tension upon said cog-belt will allow a mid-span deflection of one-quarter inch upon the application of a force of twenty-two pounds at a temperature of 60° Fahrenheit.

The replacement of the main rotor drive, of the species of rotorcraft specifically identified herein, with the drive components of the present invention results in an "all-up" weight reduction of 20 Pounds-1 Ounce, which is directly translatable to a 5 percent increase, directly on the center-of-lift, of the useful-load capacity of these rotorcraft This reduction, when considered in conjunction with the other advantages, hereinbefore enumerated, results in a safer, more reliable and trouble-free aircraft. Estimates of service-life of the present invention, based upon completed and on-going testing, indicate a probable twentyfold increase to 2,000 hours, which is also the fabricator's estimated service-life of the airframe in which it is employed.

The improvement in supplying power to the main rotor of a rotary-wing aircraft disclosed in the present invention, while employing components which are well known and documented in the prior art, over a period of thirty years, represents the first and only significant improvement in power transmission in this species of light rotorcraft for a similar period, contributes greatly to the safety of flight, and constitutes a major advancement in the art.

While there has herein been shown and described the presently preferred embodiment of the present invention, it should be understood that such has been done for purposes of disclosure and illustration only, and that certain changes, modifications, alterations, and adaptations may be made thereto within the scope of the appended claims.

What I claim is:

1. Apparatus in combination with an existing vertically oriented primary speed-reduction output shaft of a light weight rotary-wing aircraft, to an existing vertically oriented main rotor-shaft, wherein the combination comprises:

(a) a driving cog-belt sprocket (23), of a small external diameter, on said primary speed-reduction output shaft (11);

(b) said driving cog-belt sprocket being of steel or cast-iron construction;

(c) said driving cog-belt sprocket comprising a multiplicity of spaced-apart transverse lands (27) and grooves (28) about the outer peripheral face thereof;

(d) said driving cog-belt sprocket being of a width greater than the cog-belt (25); which operates thereupon;

(e) said driving cog-belt sprocket comprising cog-belt retaining means;

(f) a driven cog-belt sprocket (24), of a greater external diameter, on said rotorshaft (12);

(g) said driven cog-belt sprocket being of an aluminum-alloy construction;

(h) said driven cog-belt sprocket comprising a multiplicity of spaced-apart transverse lands (27) and grooves (28) about the outer peripheral face thereof;

(i) said driven cog-belt sprocket having a width greater than the cog-belt which operates thereupon;

(j) said driven cog-belt sprocket comprising cog-belt retaining means;

(k) said driven cog-belt sprocket having cog-belt centering means (35), and;

(l) a driving cog-belt (25), encompassing and tautly engaging said driving cog-belt sprocket and said driven cog-belt sprocket;

(m) said cog-belt centering means comprises a peripheral face (34) adapted to provide an arcuate segment of a constant radius crown (33) thereacross, centered between the opposing sides thereof;

(n) said crown extends outwardly therefrom for a dimension of approximately 0.005 inch.

2. The apparatus set forth in claim 1 wherein said driving cog-belt sprocket is adapted for fixed attachment to said primary speed-reduction output shaft.

3. The apparatus according to claim 1 wherein said driven cog-belt sprocket is adapted for central fixed attachment to existing hub means.

4. The driven cog-belt sprocket of claim 1 wherein said sprocket comprises a precise central bore to accommodate said existing hub means.

5. The driven cog-belt sprocket of claim 3 wherein said sprocket is fixedly attached to the flange of said hub means by a plurality of bolts, passing through an equal number of corresponding dimensioned bores traversing said flange and the solid central portion of said sprocket, and matching nuts.

6. The driven cog-belt sprocket of claim 3, wherein said sprocket is dynamically balanced.

7. The driving cog-belt sprocket of claim 1 wherein said sprocket comprises integral anti-excursion ring means about the upper periphery thereof.

8. The driven cog-belt sprocket of claim 1 wherein said sprocket comprises integral anti-excursion ring means about the lower periphery thereof.

9. The driving cog-belt sprocket according to claim 7 wherein said integral anti-excursion ring cooperates with a corresponding anti-excursion ring on the driven cog-belt sprocket to prevent the departure of the cog-belt therefrom.

10. The driven cog-belt sprocket according to claim 8 wherein said integral anti-excursion ring cooperates with a corresponding anti-excursion ring on the driving cog-belt sprocket to prevent the departure of the cog-belt therefrom.

11. The driven cog-belt sprocket of claim 1 whereby a return to centralized tracking of the cog-belt following flexure of said rotorshaft is assured.

12. The driven cog-belt sprocket of claim 1 wherein said crown permits the operation of a cog-belt between vertically oriented shafts.

13. The cog-belt according to claim 1 wherein said belt comprises reinforcement with poly-paraphenylene terephthalamide fibers.

14. The cog-belt according to claim 1 wherein said belt is placed under a specific tension.

15. The cog-belt of claim 14 wherein the specific tension placed thereupon is determined by the application of a specific force to the mid-span of said cog-belt to cause a specific deflection, at a specific temperature.

16. An improved method for rotational speed-reduction of a positive synchronous power transmission from an existing vertically oriented primary speed-reduction output shaft of a light-weight rotary-wing aircraft, to an existing vertically oriented main rotorshaft thereof, comprising, in combination, the steps of:

(a) removal and disposal of lubricant from existing oil containment vessel;

(b) removal and disposal of the existing oil containment vessel (16);

(c) removal and disposal of existing roller-chain (15);

(d) removal and disposal of driving roller-chain sprocket (13) from primary speed-reduction output shaft (11);

(e) removal and disposal of driven roller-chain sprocket (14) from flanged hub (31) on main rotorshaft (12);

(f) installation and fixed attachment of lesser diameter cog-belt sprocket (23) on existing primary speed-reduction output shaft (11);

(g) placement of cog-belt (25) over main rotorshaft (12);

(h) installation and fixed attachment of greater diameter driven cog-belt sprocket (24) on existing flanged hub (31);

(i) placement of cog-belt to encompass said lesser diameter driving, and said greater diameter driven cog-belt sprocket and;

(j) adjustment of cog-belt (25) tension to specification.

* * * * *